United States Patent [19]
Kemezys

[11] 3,776,649
[45] Dec. 4, 1973

[54] LOCKING BALL JOINT

[75] Inventor: Vincent A. Kemezys, Norwalk, Conn.

[73] Assignee: Barnes Engineering Company, Stamford, Conn.

[22] Filed: Aug. 23, 1972

[21] Appl. No.: 283,119

[52] U.S. Cl. .............................................. 403/90
[51] Int. Cl. ...................... B25g 3/38, F16c 11/06
[58] Field of Search ................ 287/89, 90 D, 90 R, 287/88, 21, 12, 90 C; 248/481, 482, 181

[56] References Cited
UNITED STATES PATENTS

| 1,025,884 | 5/1912 | Schmitt | 287/88 |
| 1,202,698 | 10/1916 | Ford | 287/89 |
| 1,991,363 | 2/1935 | Hodny | 287/12 |
| 2,670,228 | 2/1954 | Pagliuso | 248/181 |
| 2,671,630 | 3/1954 | Whitehead | 248/482 |
| 3,378,284 | 4/1968 | Blanchard | 287/21 |

Primary Examiner—Reinaldo P. Machado
Attorney—Joseph Levison et al.

[57] ABSTRACT

A ball-and-socket joint is provided having a mounting base with a spherical slotted socket protruding therefrom, and slotted openings being provided in the base. A ball is mounted in the spherical slotted socket, and a sleeve having fingers extending therefrom is positioned on the socket with the fingers extending into the slots of the base. A sloping ramp is provided on the base near the slots therein, whereby, on rotation of the sleeve, the fingers positioned therein are drawn up the ramp, pulling the sleeve toward the base, and clamping the ball in the slotted joint, which is accomplished by hand movement of the sleeve. When so locked, the joint is incapable of being released by hand, and requires a special tool for release.

8 Claims, 3 Drawing Figures

PATENTED DEC 4 1973    3,776,649

LOCKING BALL JOINT

BACKGROUND OF THE INVENTION

This invention relates to a universal ball-and-socket joint, and more particularly to a locking ball joint which is capable of being positioned and locked in that position by hand, but when so locked is incapable of being released by hand, and requires a special tool for release.

It is desirable for a number of applications to be able to adjust and aim an element, and lock that element in position so that it cannot be tampered with or accidentally knocked out of its desired positioning. Ball-and-socket joints are useful for this and other applications because of their universal movement within a 90° included angle. However, unless some locking means is provided, once the ball joint is positioned, it is subject to dislodgment by hand movement or some other form of accidental contact. An example of an application where it would be desirable to aim an element and lock it in position so that it could not be tampered with would be in alarm type systems. In such applications, a sensor head or transducer, which is aimed or directed to cover a desired area, would have its purpose defeated if dislodged and misdirected. It would be desirable to place such a sensor head on a universal joint which could be aimed and locked in position by hand, which could not then be tempered with by an intruder desirous of defeating the purpose of the alarm.

SUMMARY OF THE INVENTION

Accordingly, it is an object of this invention to provide a new and improved locking ball joint which is capable of being positioned and locked in the desired position by hand, but when so locked is incapable of being released by hand.

A further object of this invention is to provide a locking ball joint which is simple in construction and can be constructed entirely of molded plastic parts.

In carrying out this invention in one illustrative embodiment thereof, a locking ball joint is provided having a mounting base with a spherical slotted socket protruding therefrom. A ball having a mounting shaft extending therefrom is positioned in the socket for universal movement therein, and a sleeve is mounted for rotational movement over the socket in the slotted openings in the base. Means are provided on the base, sleeve, and socket for moving the sleeve toward the base on rotation of the sleeve, thereby locking the ball in the socket, which operation may be accomplished by hand. When so locked, the joint is incapable of being unlocked by hand, and is subject to breakage unless a special tool is utilized.

DESCRIPTION OF THE PREFERRED EMBODIMENT

Figure 1:
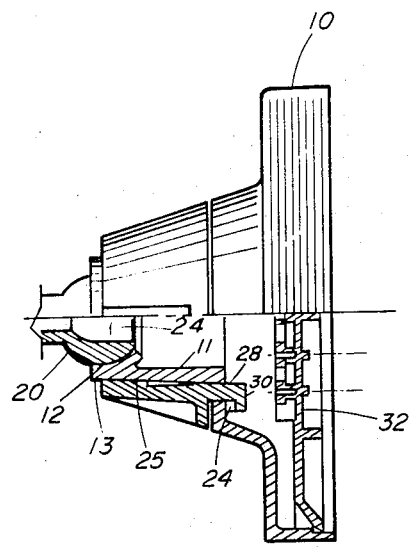
FIG. 1 is a side elevational view of one form of locking ball joint embodied in this invention.
Figure 2:
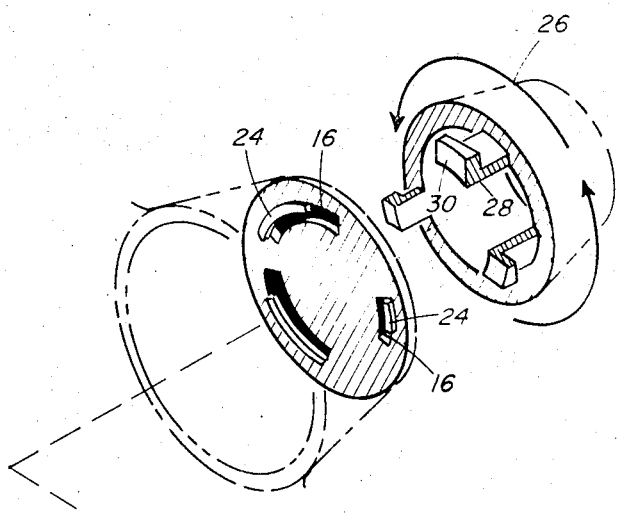
FIG. 2 is an exploded isometric view of the locking ball joint shown in FIG. 1.

Referring now to the drawings, and FIG. 2 in particular, the locking universal ball joint has a mounting base 10 having a nose 11 protruding therefrom with a spherical socket 12 carried in the end of the nose 11. The socket 12 and nose 11 are slotted at 14, and the outer surface 13 of the nose 11 is slightly tapered, as is best seen in FIG. 1. The base 10 also carries arcuate slots 16 which are keyed at 18. The arcuate slots 16 are positioned behind the nose 11 in base 10. A ball 20 having a mounting shaft 22 integral therewith is positioned for universal movement in the socket 12. A sleeve 26 has fingers 28 which are flanged at 30 protruding therefrom which are adapted to be received through keys 18 of the arcuate slots 16, which thus mounts the sleeve 26 to the base 10 over the socket 12 in nose 11. The inner surface 25 of the sleeve 26 is slightly tapered as shown in FIG. 1, which taper is complementary to the taper on the outer surface 13 of the socket 12.

Figure 3:
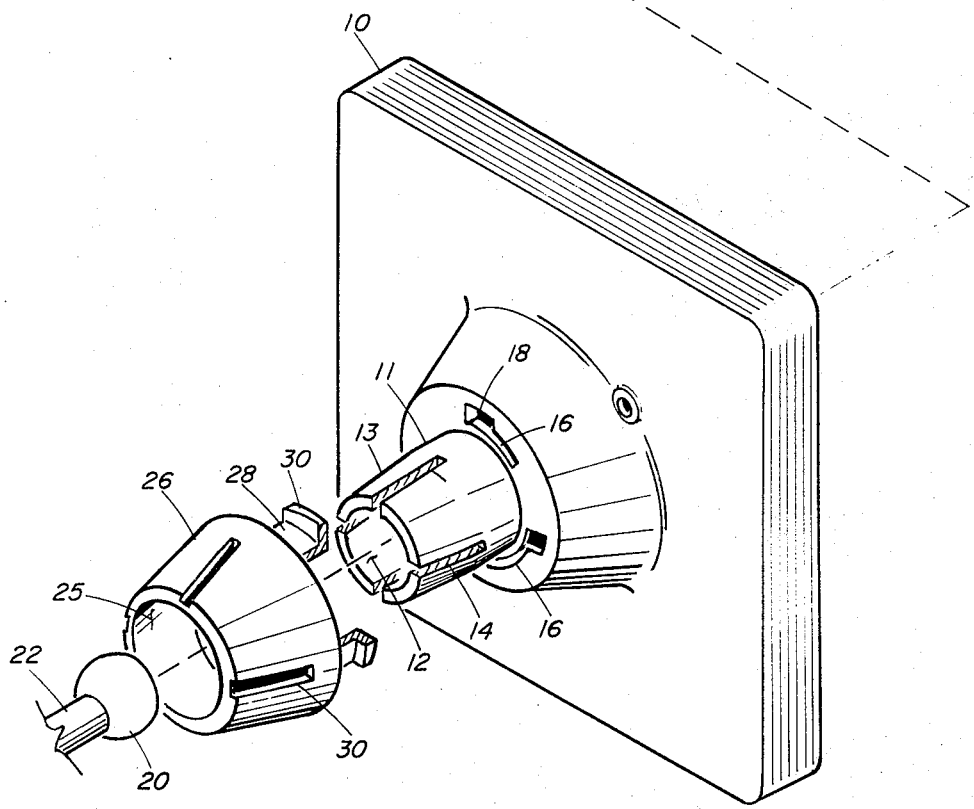
FIG. 3 is a reverse exploded isometric view partly in phantom, showing some of the parts of the ball joint of FIG. 2.

As will best be seen in FIG. 3, a ramp 24 with an increasing slope is provided on the upper side and at the rear of the arcuate slots 16 in the base 10. Accordingly, when the flanges 30 of the fingers 18 are inserted into the keys 18 and the arcuate slots 16, clockwise rotational movement of the sleeve forces the flanges 30 up the ramp 24 with the increasing slope pulling the sleeve 26 toward the base. When this happens, the tapered inner edge 25 of the sleeve 26 moves down the tapered outer edge 13 of the socket 12 to frictionally lock the ball 12 in the socket.

The ball, sleeve and base are all preferably made of molded plastic parts having a high coefficient of friction. For example, a plastic sold under the trademark LEXAN has been found suitable for the present application. It will be apparent, however, that other types of material, such as metal, may be used. It has been found using the plastic that a joint so locked by rotating the sleeve by hand cannot be unlocked by hand, which is what is desired. However, should the need arise to remove the joint, slots 30 have been provided in the sleeve 26 in which a special tool in the form of an adjustable spanner wrench may be inserted to unlock the joint. The ball 20 and mounting shaft 22 may be hollow, as shown by the channel 24 provided therethrough, which may be utilized for electrical connections or other linkage which may be attached to the shaft 22 which is desired to be positioned and then locked. Likewise, a terminal board 32 is shown in FIG. 1 in the base 10 for accommodating electrical connections to a sensor or transducer mounted on the shaft 22.

To illustrate the operation, it will be assumed that a burglar alarm sensing head is mounted on the end of shaft 22 which is mounted on the ball joint 20. On installation in a given location or room, the sensor head is moved to the desired position by the universal rotation of the ball 20 in the socket 12. When the desired position or alignment is achieved, the sleeve 26 is rotated clockwise with the flanges 32 of fingers 28 forced upward on the ramp 24, moving the sleeve 26 toward the base and applying frictional pressure to the slotted socket 12. The complementary tapers of the outer surface 13 of the socket 12 and the inner surface 25 of the sleeve 26 lock the ball in position, and thus firmly mount the burglar alarm sensor in position for surveillance of the desired area. When so locked, the sensor head cannot be moved by its own weight or wear, and it is incapable of being tampered with by an intruder whom it is desired to detect. If the structure is made of plastic and an intruder tried to tamper with the joint by hand, he would find that if enough pressure is exerted, the joint might break, which could cause an alarm to go off. Should a service man or other authorized personnel wish to reposition the sensor head or remove it, he merely has to use an adjustable spanner wrench which is inserted into the slots 30 in the sleeve 26 and rotate it counterclockwise to provide release and disassembly.

Since other modifications, varied to fit particular operating requirements and environments, will be apparent to those skilled in the art, the invention is not considered limited to the examples chosen for purposes of disclosure, and covers all changes and modifications which do not constitute departures from the true spirit and scope of this invention.

I claim:

1. A locking ball joint which is capable of being positioned and locked in position by hand but when so locked is incapable of being released by hand, comprising
    a. a mounting base having a spherical socket protruding therefrom and having slotted openings in said base behind said socket,
    b. a ball having a mounting shaft extending therefrom with said ball being positioned in said socket for universal movement therein,
    c. a sleeve mounted for rotational movement in the slotted openings of said base, said sleeve extending over a portion of said socket,
    d. means for moving said sleeve toward said base on the rotation of said sleeve in said base, and
    e. locking means for locking said ball in said socket when said sleeve is rotated and moved toward said base.

2. The locking ball joint set forth in claim 1 wherein said spherical socket is slotted.

3. The locking ball joint set forth in claim 1 wherein said sleeve has flanged fingers and said base has a ramp with an increasing slope positioned on the under side of said base and on the top of said slots whereby the insertion and rotation of the fingers of said sleeve in said slots move said sleeve back on said socket thereby locking the ball in said socket.

4. The locking ball joint set forth in claim 1 wherein the outer surface of said socket is slightly tapered and the inner surface of said sleeve is slightly tapered in the same direction as the outer surface of said socket so that the two surfaces provide increasing frictional contact on the rotation and rearward movement of said sleeve on said base thereby locking said ball in said socket.

5. The locking ball joint set forth in claim 1 wherein said ball and mounting shaft have a hollow channel therethrough.

6. The locking ball joint set forth in claim 1 wherein all the parts are molded plastic having a high coefficient of friction.

7. The locking ball joint set forth in claim 4 wherein said socket is slotted.

8. The locking ball joint set forth in claim 4 wherein said sleeve has a plurality of indentations therein adapted to receive a tool for unlocking said ball after it has been locked.

* * * * *